US006807233B1

(12) United States Patent
Sato et al.

(10) Patent No.: US 6,807,233 B1
(45) Date of Patent: Oct. 19, 2004

(54) SAMPLE DATA TRANSMITTING METHOD, RECEIVING METHOD, TRANSMISSION/RECEPTION METHOD AND ITS TRANSMISSION APPARATUS, RECEPTION APPARATUS, TRANSMISSION/RECEPTION APPARATUS

(75) Inventors: Makoto Sato, Tokyo (JP); Yoshio Osakabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/512,044

(22) Filed: Feb. 24, 2000

(30) Foreign Application Priority Data

Feb. 25, 1999  (JP) ............................................ 11-048698

(51) Int. Cl.[7] .............................................. H04L 27/00
(52) U.S. Cl. ........................ 375/259; 375/295; 375/316
(58) Field of Search ................................ 375/219, 221, 375/257, 259, 295, 316; 370/391, 392, 463, 466, 512; 360/48

(56) References Cited

U.S. PATENT DOCUMENTS

| 5,448,562 A | * | 9/1995 | Osakabe et al. | ............ 370/392 |
| 5,535,208 A | * | 7/1996 | Kawakami et al. | .......... 370/391 |
| 5,710,773 A | * | 1/1998 | Shiga | .......................... 370/512 |
| 5,933,430 A | * | 8/1999 | Osakabe et al. | ............ 370/463 |
| 6,101,215 A | * | 8/2000 | Takeda et al. | ............... 375/221 |
| 6,137,949 A | * | 10/2000 | Horiguchi et al. | ............. 386/82 |

FOREIGN PATENT DOCUMENTS

| DE | 4223477 | 1/1994 | ............ H04L/12/48 |
| EP | 0762684 | 3/1997 | ............ H04H/1/00 |
| EP | 0838926 | 4/1998 | ........... H04L/12/64 |
| EP | 0877370 | 11/1998 | ........... G11B/20/10 |
| EP | 0892404 | 1/1999 | ........... G11B/20/10 |

OTHER PUBLICATIONS

M. Mourad and A. Tantawy, *Video–On–Demand: Experience with Protocols and their Implementation*, IBM Thomas J. Watson Research Ctr., No. XP000675690, pp. 446–51, 1995.

Audio/Video Working Group of the 1394 Trade Association, *Audio and Music Data Transmission Protocol*, No. XP 002176033, pp. 1–21, Version 1.0, May 1997.

* cited by examiner

*Primary Examiner*—Chieh M. Fan
(74) *Attorney, Agent, or Firm*—Jay H. Maioli (57) ABSTRACT

In order to transmit and receive sample data of different sampling frequencies collectively, the first row of a packet is composed of four bytes and the first and second rows are provided with headers prescribed by the IEEE1394 standard. Also, the second byte in the third row is provided with the first counted value of a data block counter and a fourth byte is provided with a next to the last counted value (DBC) of the data block counter. Further, latter half two bytes in the fourth row are provided with a value of a reference time (time stamp data). The first two bits in the fifth row are provided with values showing recording media, the fourth bits are provided with flags showing sampling frequencies, the seventh and eighth bits are provided with values showing quantized bit numbers, and the second three bytes and after are provided with sample data. The last row of the packet is provided with an error correcting code for data transmitted in and after the third row.

25 Claims, 6 Drawing Sheets

| data_length | | tag | channel | tcode | sy |
|---|---|---|---|---|---|
| header_CRC | | | | | |
| data_field | | | | | |
| | pad_field | | | | |
| data_CRC | | | | | |

FIG. 2B
(Prior Art)

| destination_ID | tl | rt | tcode | pri |
|---|---|---|---|---|
| source_ID | | | | |
| destination_offset | | | | |
| quadlet_data | | | | |
| header_CRC | | | | |

FIG. 2C
(Prior Art)

| destination_ID | tl | rt | tcode | pri |
|---|---|---|---|---|
| source_ID | | | | |
| destination_offset | | | | |
| cycle_time_data | | | | |
| header_CRC | | | | |

018# SAMPLE DATA TRANSMITTING METHOD, RECEIVING METHOD, TRANSMISSION/ RECEPTION METHOD AND ITS TRANSMISSION APPARATUS, RECEPTION APPARATUS, TRANSMISSION/RECEPTION APPARATUS

BACKGROUND OF THE INVENTION

1. Field of the Invention

The present invention relates to a sample data transmitting method, a sample data receiving method, and a sample data transmission method as well as its transmitting apparatus, its receiving apparatus, and its transmission apparatus suited for use to reproduce DVD audio to which is applied, for example, DVD-ROM (Read-Only-Memory). Particularly, it is intended that a plurality of data sampled at different sampling frequencies can effectively be transmitted in a predetermined transmission format.

2. Description of the Related Art

For example, as a recording medium of a digitized sound signal, a DVD audio to which DVD-ROM is applied has been developed. Then, in such DVD audio, by taking advantage of the fact that a recording capacity of the DVD-ROM is extremely large, an attempt has been carried out to record a multi-channel and high quality sound signal with a sampling frequency set at 96 kHz for example.

Specifically, as for a format of such DVD audio, a total of four channels are recorded by providing 2 channels of sample data for example, with a sampling frequency of 96 kHz and the number of quantized bits of 24 bits for a main acoustic signal as well as 2 channels of sample data with a sampling frequency of 48 kHz and the number of quantized bits of 16 bits for a sub-acoustic signal such as a so-called surround and the like.

By the way, with a digital acoustic apparatus such as a DVD player and the like, the conventional one has been made for example, to D/A-convert a digitally reproduced signal within the apparatus to take out as an analog acoustic signal and supply it to another amplifier and the like. However, an originally digitized signal is advantageously transmitted as it is against signal deterioration during transmission. Also, for example, by using busfrom transmission paths, the number of laid-on transmission paths can be reduced.

Figure 1:
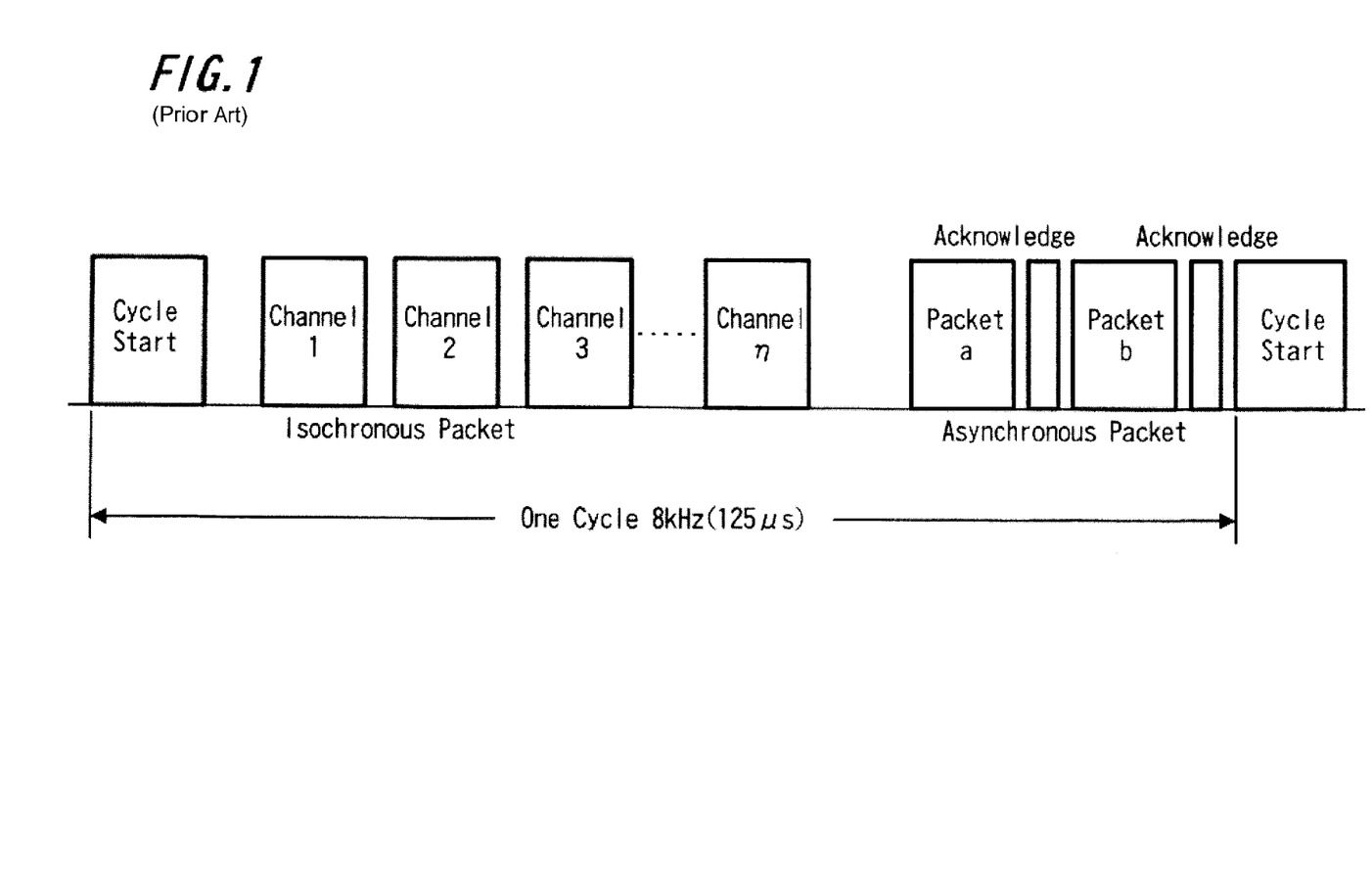
FIG. 1 is a diagram for describing IEEE1394.

Then, as a means for transmitting such a digital acoustic signal as it is, a format regulated by IEEE1394 is used for example. According to the format, a synchronizing signal (cycle start) is generated from, for example, reference apparatus as a constant cycle (125 $\mu$s) as shown in FIG. 1. Between the synchronized signals, an arbitrary number of signal channels (1 to n) called isochronous (synchronous) packet are provided.

Figure 2A:
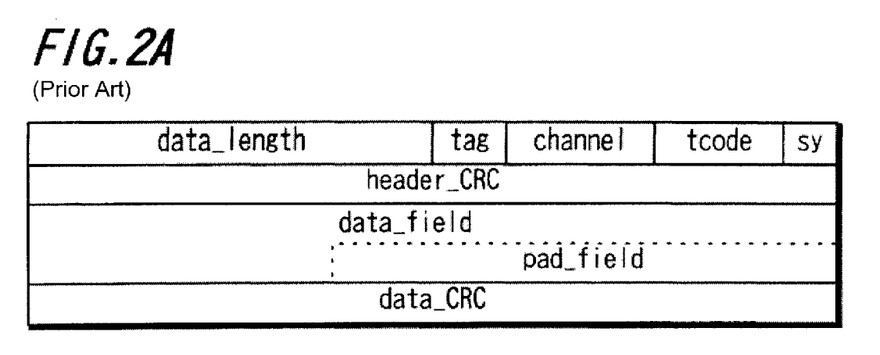
FIGS. 2A–2C are diagrams for describing transmitting packets.

The isochronous packet has a structure, e.g. as shown in FIG. 2A. The first row of the packet is one quadlet (4 bites=32 bits). For the first half 2 bytes in the first row of the packet -is provided a value (data length) indicating a length of the subsequent area. Also, for the latter half 2 bytes in the first row are provided a value (tag) showing a format of the packet, a value (channel) showing a channel number, a value (tcode) to identify the packet, a value (sy) used for synchronization and so on.

That is, the first row of the isochronous packet is made a header area wherein information on various kinds of controls is provided. Further, in the second row is provided an error correcting code (header CRC) for data on the above-mentioned header area in the first row. Then, in and after the third row of the isochronous packet is provided data on a digital acoustic signal to be transmitted and the like over the range shown in the above-mentioned value (data length). Also, in the last row of the packet is provided an error correcting code (data CRC) for data transmitted in and after the third row.

Moreover, a section for transmitting such as control information and the like called an asynchronous (nonsynchronous) packet is provided in a remaining period after the isochronous packet (the minimum amount is secured) between on the above synchronizing signals (cycle start). Then, in accordance with control information transmitted via the asynchronous packet, transmission of the digital acoustic signal and the like is carried out between arbitrary apparatuses using some channel of the above-mentioned asynchronous packet.

Figure 2B:
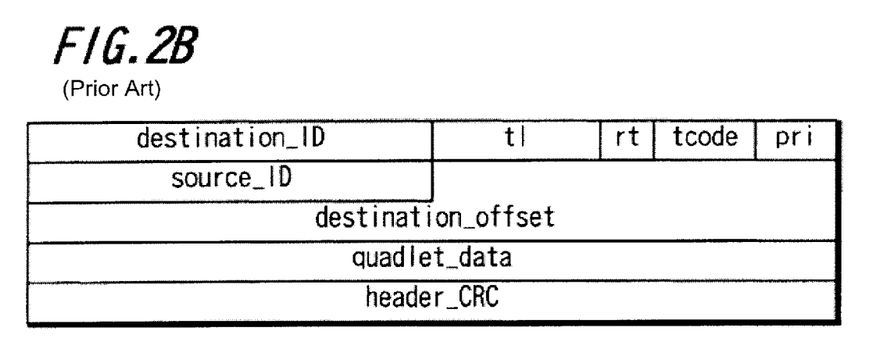

In FIG. 2B is shown a structure of the asynchronous packet where controlling information (data) of, for example, one quadlet is written into a desired memory or register of the arbitrary apparatus. The first row of the packet is one quadlet and for the first half 2 bytes in the first row is provided an identifying code of a destination (addressee) apparatus (destination ID). Also, for the first half 2 bytes in the second row is provided an identifying code of a sending apparatus (source ID). Meanwhile, these identifying codes are beforehand set for each of apparatuses for example, at a time of constructing a system.

For the latter half 2 bytes in the first row are provided a label (t1) for showing a series of controlled states (transaction), a code (rt) for showing a status of retransmission, a value (tcode) for distinguishing the packet and a value (pri) for showing order of priority. Further, for the latter half 2 bytes in the second row and in the third row are provided addresses of a memory of the destination and the like (destination offset). Data of 4 bytes to be written is provided in the fourth row. Then, in the fifth row is provided error correcting codes (header CRC) for each of data in the first to fourth rows.

Figure 2C:
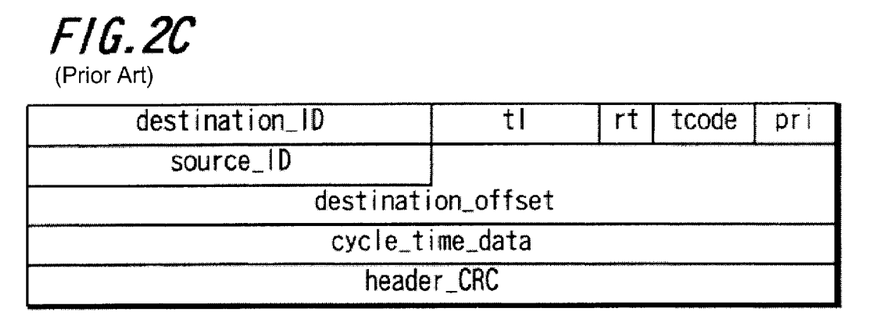

Furthermore, in FIG. 2C is shown a structure of the synchronizing signal (cycle start). The synchronizing signal is also transmitted with the structure of the asynchronous packet. The first and third rows of this packet are the same as those of another asynchronous packet. However, with the packet of synchronizing signal, all apparatuses are designated by the destination identifying code in the first half 2 bytes in the first row. The sender identifying code of the first half 2 bytes in the second row provides that of the reference apparatus.

In the fourth row of the packet is provided a cycle time code (a value of a timer register provided in the reference apparatus). Further, in the fifth row is provided an error correcting code (header CRC) for each of data in the first to fourth rows. By the way, in the asynchronous packet are defined some forms other than this such as a writing, a read-out request and a read-out response for data of 1 quadlet or more but they are not relevant to this application and thus are not described.

Therefore, by using such a transmission format, it is possible for a bus line to connect between, for example, the above-mentioned DVD player or the like and the acoustic apparatus of other digital formats or the like. Thus, mutual control is carried out between these apparatuses using the control information transmitted by way of the above-mentioned asynchronous packet. This control enables mutual transmission of data such as an arbitrary digital acoustic signal and the like by using some channel of the above-mentioned asynchronous packet between these apparatuses.

However, in such a transmission format, for example, a sampling frequency of a digital acoustic signal is such that one frequency is determined corresponding to a signal of one system. Therefore, when there are a main acoustic signal at, a sampling frequency of 96 kHz and a sub-acoustic signal at a sampling frequency of 48 kHz as the above-mentioned DVD audio recording signal, it has been impossible to transmit these signals collectively (en bloc) on the conventional format.

Then, when these signals are transmitted on the conventional format, it is conceivable that the sub-acoustic signal at a sampling frequency of 48 kHz is doubled by a prior value holding or the like and is transmitted twice at a timing rate of the sampling frequency of 96 kHz. However, with this method, data to be transmitted becomes redundant with a resultant degradation in data transmission efficiency by the whole bus. It is also conceivable that the system is divided according to, for example, sampling frequency, but there then arises a necessity to provide a reproducing means for each system, and also a necessity to maintain synchronization among respective systems, which makes an apparatus complicated.

SUMMARY OF THE INVENTION

The present invention is implemented in view of these points and the problems to be solved are such that the conventional transmission format has made it impossible to transmit signals sampled at different sampling frequencies en bloc and when such signals are to be transmitted, there has been a fear that data transmission efficiency is degraded and the apparatus becomes complicated.

Therefore, the present invention is such that, for sample data at different sampling frequencies, data generated during one of the sampling periods is collected together to form a data block and at the same time, data of the number of sample data generated during the sampling period is added thereto. This makes it possible to transmit en bloc signals at different sampling frequencies as well as to easily reconstruct and restore these sample data.

DESCRIPTION OF THE PREFERRED EMBODIMENT

Specifically, the first embodiment according to the present invention is a sample data transmitting method of transmitting a first sample data sampled at a first sampling frequency and a second sample data sampled at a second sampling frequency higher than the first sampling frequency, in which the transmission is carried out by collecting together the first and second sample data generated during a sampling period of the first sampling frequency into a data block and by adding generated counter data corresponding to a counted value of the number of data samples of the first data portion As a result, it is possible to transmit en bloc signals sampled at different sampling frequencies as well as to easily reconstruct and restore these sample data.

The second embodiment according to the present invention is a sample data receiving method of receiving a transmitted signal comprising a first sample data sampled at a first sampling frequency and a second sample data sampled at a second sampling frequency higher than the first sampling frequency, and in which the first and second sample data generated during a sampling period of the first sampling frequency are collected together to form a data block, and data of the number corresponding to the number of sample data generated during the sampling period of the first sampling frequency is added to the second sample data. The reception is carried out by forming a first clock signal of the first sampling frequency as well as forming a second clock signal of the second sampling frequency from the first clock signal and at the same time, discriminating of the number data corresponding to the number of sample data, added to the second sample data, generated during the sampling period of the first sampling frequency, for reconstructing a data sequence of the second sample data. As a result, it is possible to transmit en bloc signals by different sampling frequencies as well as to easily reconstruct and restore these sample data.

Further, the third embodiment according to the present invention is a sample data transmission method of transmitting a first sample data sampled by a first sampling frequency and a second sample data sampled by a second sampling frequency higher than the first sampling frequency, in which: the transmission side collects together that the first and second sample data generated during a sampling period of the first sampling frequency to form a data block and adds data of the number corresponding to the number of sample data generated during the sampling period of the first sampling frequency to the second sample data; for transmission and the receiving side forms a first clock signal of the first sampling frequency as well as forms a second clock signal of the second sampling frequency by multiplying the first clock signal and at the same time, discriminates data of the number corresponding to the number of sample data, added to the second sample data, which are generated during the sampling period of the first sampling frequency to reconstruct the second sample data for reception. As a result, it is possible to transmit en bloc signals by different sampling frequencies as well as to easily reconstruct and restore these sample data.

Also, the fourth embodiment according to the present invention is a sample data transmitting apparatus for transmitting a first sample data sampled at a first sampling frequency and a second sample data sampled at a second sampling frequency higher than the first sampling frequency, comprising means for forming en bloc the first and second sample data generated during a sampling period of the first sampling frequency into a data block and means for adding data of the number corresponding to the number of sample data generated during the sampling period of the first sampling frequency to the second sample data. As a result it is possible to transmit en bloc signals at different sampling frequencies as well as to easily reconstruct and restore these sample data.

Further, the fifth embodiment according to the present invention is a sample data receiving apparatus for receiving a transmitted signal comprising a first sample data sampled by the first sampling frequency and a second sample data sampled by a second sampling frequency higher than the first sampling frequency, and in which: the first and second sample data generated during a sampling period of the first sampling frequency are formed collectively into a data block; and data of the number corresponding to the number of sample data generated during the sampling period of the first sampling frequency is added to the second sample data. It comprises means for forming a first clock signal of the first sampling frequency, means for forming a second clock signal of the second sampling frequency from the first clock signal, and means for discriminating data of the number corresponding to the number of the sample data generated during the sampling period of the first sampling frequency, which are added to the second sample data, to reconstruct the data sequence of the second sample data for reception. As a result it is possible to transmit en bloc signals by different sampling frequencies as well as to easily reconstruct and restore these sample data.

Also, the sixth embodiment according to the present invention is a sample data transmission apparatus for transmitting a first sample data sampled at a first sampling frequency and a second sample data sampled at a second sampling frequency higher than the first sampling frequency, comprising: means to collect together the first and second sample data generated during a sampling period of the first sampling frequency to form a data block, means for adding data of the number corresponding to the number of sample data generated during the sampling period of the first sampling frequency to the second sample data for transmission; and means for forming a first clock signal of the first sampling frequency as well as forming a second clock signal of the second sampling frequency by multiplying the first clock signal and discriminating data of the number corresponding to the number of sample data, added to the second sample data, generated during the sampling period of the first sampling frequency to reconstruct the second sample data for reception. As a result, it is possible to transmit en bloc signals at different sampling frequencies as well as to easily reconstruct and restore these sample data.

Figure 3:
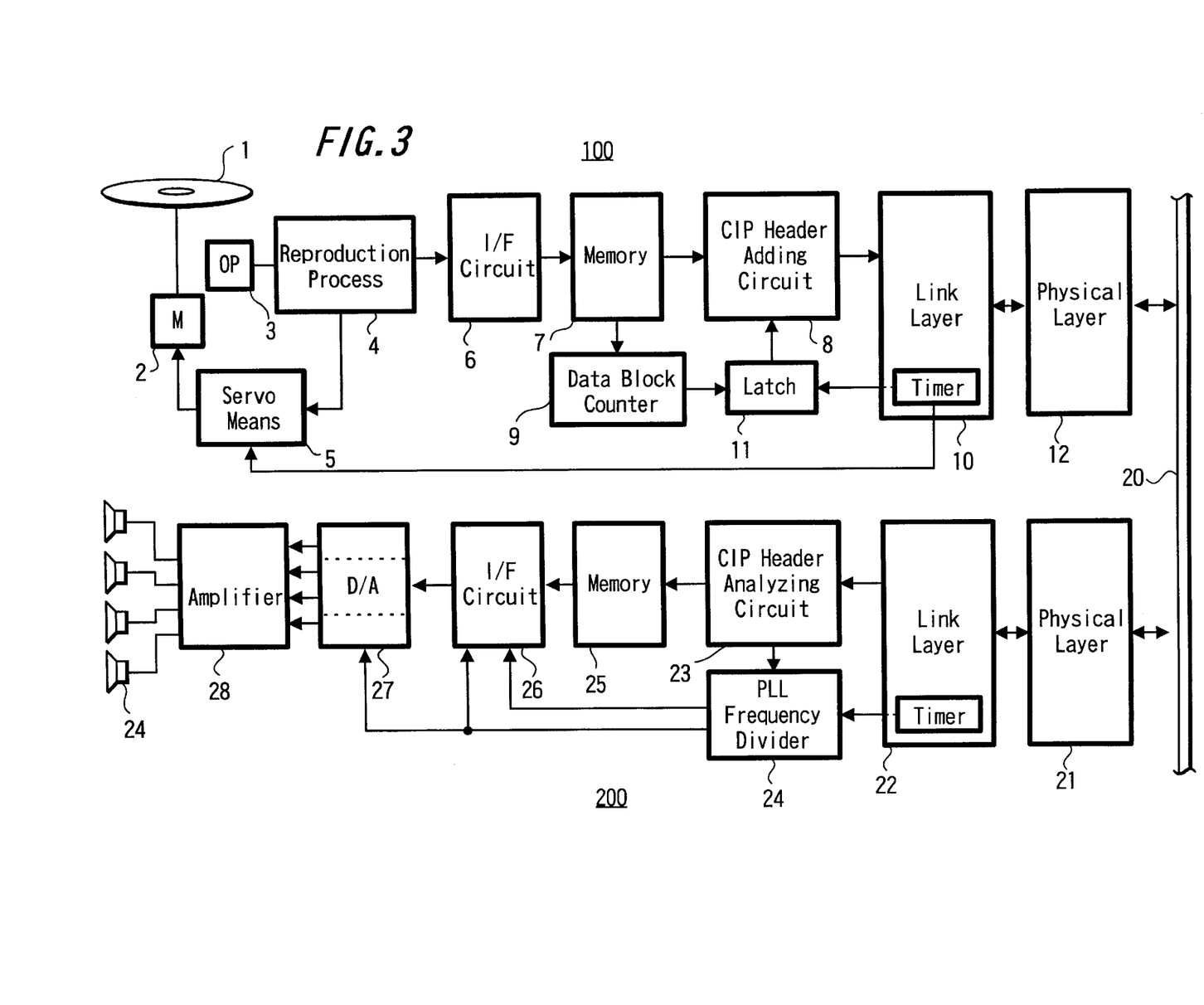
FIG. 3 is a block diagram of one embodiment of a sample data transmitting apparatus according to the present invention.

The embodiments of the present invention will be described below with reference to the drawings. FIG. 3 is a block diagram showing the whole structure of a system to which the sample data transmitting method, receiving method, transmission method, and its transmitting apparatus, receiving apparatus, transmission apparatus according to the present invention are applied.

Referring to FIG. 3, in a transmitting apparatus 100 is provided a disc 1 as a recording medium of a digitized acoustic signal such as DVD audio and the like to which, for example, a DVD-ROM-(Read-Only-Memory) is applied. This disc 1 is rotated by a motor 2 and from a recording surface of the rotated disc 1 is derived a recorded signal through an optical pickup 3. Then, the derived signal is supplied to a reproduction processing apparatus 4 and a digital acoustic signal according to a format of the above-mentioned DVD audio is reproduced.

Specifically, in the above-mentioned DVD audio format, a total of 4 channels comprising 2 channels for sample data with the sampling frequency of 96 kHz and the quantized bit number of 24 bits for, for example, a main acoustic signal and 2 channels for sample data with the sampling frequency of 48 kHz and the quantized bit number of 16 bits for, for example, a sub-acoustic signal such as surround or the like are recorded and these recorded digital acoustic signals are reproduced.

Meanwhile, a synchronizing signal detected together with the acoustic signal in the above-mentioned reproduction processing apparatus 4 is supplied to a servo means 5 for driving the motor 2. Then, the above-mentioned synchronizing signal is compared with a reference clock signal from, for example, an interior timer described below in the servo means 5 and in order for these timing to have predetermined relations, revolution of the motor 2 is servo-controlled. As a result, the disc 1 connected to the motor 2 is rotated at a predetermined revolution speed for reproducing, for example, the digitized acoustic signal.

Further, the digitized acoustic signal reproduced by the above-mentioned reproduction processing apparatus 4 is supplied to a memory 7 through an interface (I/F) circuit 6. Then, in the memory 7, for example, a total of 6 sample data comprising 4 pieces of sample data for 2 channels×2 samplings, a sampling frequency of 96 kHz and the quantized bit number of 24 bits and 2 pieces of sample data for 2 channels, a sampling frequency of 48 kHz and the quantized bit number of 16 bits are formed into one data block.

To be specific, as mentioned above, the sample data of a left channel (Main, Lch) and a right channel (Main, Rch) of the main acoustic signal are formed by a sampling frequency of 96 kHz and the sample data of a left channel (Rear, Lch) and a right channel (Rear, Rch) of the sub-acoustic signal are formed by a sampling frequency of 48 kHz. As a result, as shown in FIG. 4, the sample data of the main acoustic signal are formed twice that of the sub-acoustic signal.

Figure 4:
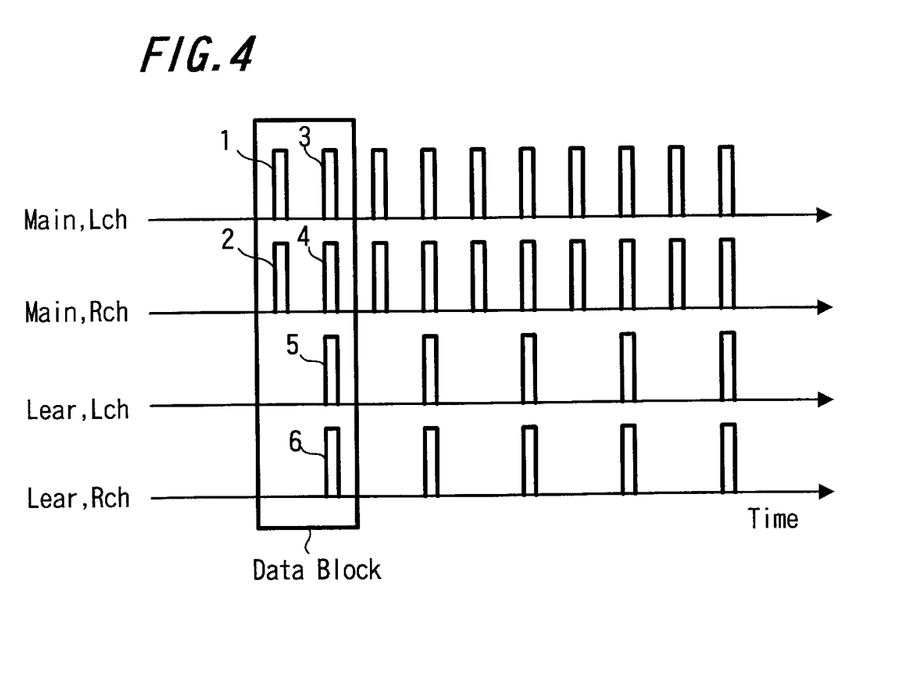
FIG. 4 is a diagram for describing operations of the same.

Then, in the above-mentioned interface circuit 6 and the memory 7, as shown surrounding by a line in FIG. 4, out of these sample data, 6 pieces of the sample data being a sum of a total of 4 pieces (1, 2, 3, 4) of respective 2 pieces of the left channel and the right channel of the main acoustic signal and a total of 2 pieces (5, 6) of each one piece of the left channel and the right channel of the sub-acoustic signal are combined, for example, in order of illustrated numbers to form one data block.

Figure 5:
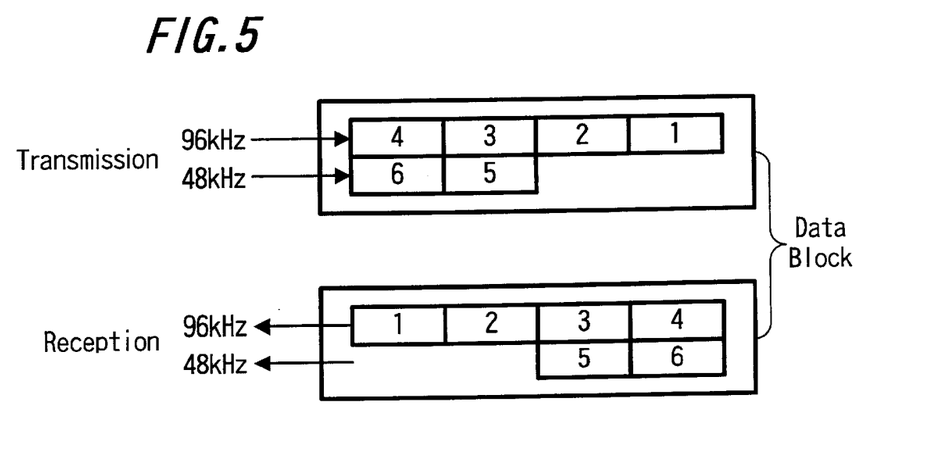
FIG. 5 is a diagram for describing operations of the same.

Meanwhile, in a case where there are 2 serial interfaces for 96 kHz sample data of 2 channels and 48 kHz sample data of 2 channels between the reproduction processing circuit 4 and the interface circuit 6, as shown, for example, in the transmitting side of FIG. 5, 6 pieces of sample data consisting of 4 pieces of sample data from the 96 kHz serial interface and 2 pieces of sample data from the 48 kHz serial interface are combined to form one data block.

The thus formed data blocks are inputted in the memory 7. Here, the memory 7 is made to have a so-called first-in-first-out structure, wherein the inputted data blocks are outputted in the inputted order at predetermined timing. Then, the outputted data blocks are supplied to a CIP header adding circuit 8 described below. At the same time, the number of the data blocks inputted in the above-mentioned memory 7 is counted by a block counter 9.

Further, the counted value from the data block counter 9 and a reference time from a cycle timer provided at a link layer 10 for, e.g. a serial bus according to IEEE1394 described below, are both supplied to a latch circuit 11. Then, a reference time from the cycle timer at a time when, for example, the 3 low order digits of the counted value (binary numeral) of the above-mentioned data block counter 9 becomes [0000] is latched and the latched reference time is supplied to the header adding circuit 8.

Then, in the header adding circuit 8, headers provided, for example, in the third and fourth rows of the above-mentioned isochronous packet are formed as described below and the data block is provided as follows. In addition, the isochronous packet is formed in a constant cycle (125 µs). Therefore, a plurality of the data blocks generated during the cycle (125 µs). are provided in one isochronous packet.

Figure 6:
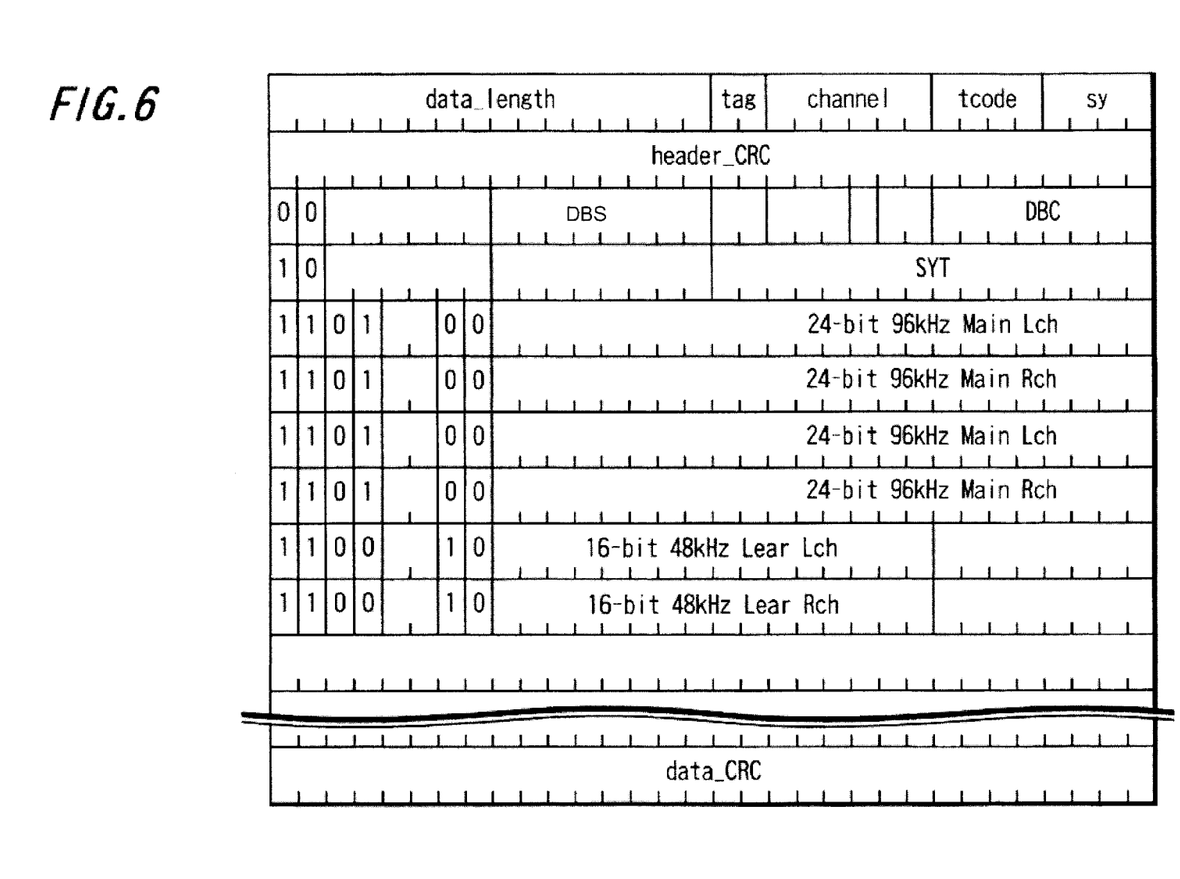
FIG. 6 is a diagram for describing an isochronous packet to which the present invention is applied.

Specifically, the structure of the isochronous packet formed is shown in FIG. 6. In this FIG. 6, one row of the packet is one quadlet (4 bytes=32 bits). Prescribed headers formed in the link layer 10 described below are provided in the first and second rows of the isochronous packet. Then, in the third and fourth rows following the first and second rows are provided the header describing about the data block transmitted on this packet.

In the first 2 bits in the third row of the isochronous packet is provided a value [00]. At the second one byte in the third row, is provided a counted value (DBS) of the data block counter 9 when the first data block transmitted on the isochronous packet is formed. Further, at the fourth one byte is provided the next counted value (DBC) of the data block counter 9 when the last data block transmitted on this isochronous packet is formed.

Also, in the first 2 bits in the fourth row of the isochronous packet is provided a value [10]. In the last half 2 bytes in the fourth row is provided a reference time (time stamp data) value (SYT) from the cycle timer latched by the above-mentioned latch circuit 11. Meanwhile, in the blank portions in the figure are provided other control data and the like, but since they have nothing to do with the application of the present invention, its description is omitted. In this manner, the predetermined CIP (Common 1sochronous Packet) header is provided in the third and fourth rows of the ischronous packet.

Further, after the fifth row of the isochronous packet are provided the above-mentioned data blocks. Here, in FIG. 6, 4 pieces of sample data for the above-mentioned sampling frequency of 96 kHz, the quantized bit number of 24 bits and 2 channels 2 samplings as well as 2 pieces of sample data for the sampling frequency of 48 kHz, the quantized bit number of 16 bits and 2 channels are provided in one row, respectively. At the same time, these 6 pieces (rows) of sample data are made into one data block, and a plurality of the data blocks generated during the above-mentioned cycle (125 µs) are successively provided.

In the fifth row is provided the first sample data of the left channel of the main acoustic signal of, for example, a sampling frequency of 96 kHz, the quantized bit number of 24 bits (24-bit 96 kHz, Main, Lch). Then, in the first 2 bits in the fifth row is provided a value [11] showing, for example, DVD audio and at the fourth bit is provided a flag [1] showing that the following sample data is data sampled by a twofold sampling frequency. Further, at the seventh and eighth bits is provided a value [00] showing that the quantized bit number of the succeeding sample data is 24 bits.

Similarly, in the 6th row is provided the first sample data of the right channel of the main acoustic signal of, for example, a sampling frequency of 96 kHz, the quantized bit number of 24 bits (24-bit, 96 kHz, Main, Rch). Also, in the seventh row is provided the second sample data of the left channel of the main acoustic signal of a sampling frequency of 96 kHz, hte quantized bit number of 24 bits (24-bit, 96 kHz, Main, Lch) and in the eighth row is provided the second sample data of the right channel of the main acoustic signal of a sampling frequency of 96 kHz, the quantized bit number of 24 bits (24-bit, 96 kHz, Main, Rch).

Further, in the ninth row is provided a sample data of the left channel of the sub-acoustic signal of, for example, a sampling frequency of 48 kHz, the quantized bit number of 16 bits (16-bit, 48 kHz, Rear, Lch). Then, in the first 2 bits in the ninth row is provided a value [11] showing, for example, DVD audio and at the fourth bit is provided a flag [0] showing that the succeeding sample data is data sampled by a basic sampling frequency. Further, at the seventh and eighth bits is provided a value [10] showing that the quantized bit number of the succeeding sample data is 16 bits.

Similarly, in the tenth row is provided a sample data of the right channel of the sub-acoustic signal of, for example, a sampling frequency of 48 kHz, the quantized number of 16 bits (16-bit, 48 kHz, Rear, Rch). Then, these 6 pieces (rows) of sample data are made into one data block and a plurality of the data blocks generated during the above-mentioned cycle (125 µs) are successively provided. In addition, although succeeding data blocks are omitted, rows of the same form are repeated. Further, in the last row of the packet is provided an error correction code (data CRC) for data transmitted on and after the third row.

Data on and after the third row of the thus formed isochronous packet is supplied from adding the above-mentioned CIP header circuit 8 to the link layer 10 for the serial bus of the IEE1394. Then, in the link layer 10 is generated the prescribed isochronous packet header which is provided in the first and second rows of the isochronous packet. That is to say, in the first half 2 bytes in the first row of the packet is provided a value (data length) showing a length of subsequent data area.

Also, in the latter half 2 bytes in the first row of the packet are provided data such as a value (tag) showing a format of the packet, a value (channel) showing a predetermined channel number, a value (tcode) for identifying the packet, and a value (sy) used for synchronization to form the prescribed header. In this case, in the value (tag) showing a format of the packet is provided a value indicating that CIP header is included in the subsequent data. Further, in the second row is provided an error correction code (header CRC) for the header area data in the above-mentioned first row.

The isochronous packet is formed in this manner. In FIG. 3, the thus formed isochronous packet is further supplied from the above-mentioned link layer 10 to a physical layer 12 for a serial bus of the IEEE1394. Then, from the physical layer 12 is carried out transmission to the serial bus 20 at predetermined timing in accordance with a synchronizing signal (cycle start) and the like transmitted on, for example, the IEEE1394 serial bus 20.

Further, the isochronous packet transmitted to the serial bus 20 is supplied to a link layer 22 through, for example, a physical layer 21 of a receiving apparatus 200 and a necessary packet is received by discriminating the above-mentioned value (channel) showing a channel number for example. Then, the received isochronous packet is supplied from the link layer 22 to a CIP header analyzing circuit 23 of and an analysis of the header provided, for example, in the third and fourth rows of the isochronous packet is carried out.

Specifically, as mentioned above, on the transmitting side, the reference time from the cycle timer at a time, for example, when the low three order digits of the counted value (binary numeral) of the data block counter 9 becomes [000] is latched, and the latched reference time is transmitted as a value (SYT) of the CIP header. Also, the counted value (DBS) of the data block counter 9 at a time when the first data block to be included in the isochronous packet is formed and the next counted value (DBC) of the data block counter 9 when the last data block is formed are transferred on the CIP header.

At the CIP header analysis circuit 23, by using the counted value (DBS) and the counted value (DBC), a data block when the three low order digits of the counted value (binary numeral) of the data block counter 9 becomes [000] is identified. BY deriving the identified data block at a time corresponding to the value (SYT) of the reference time (time stamp data), the timing for deriving the data block can be synchronized.

These conditions will be described referring to FIG. 7. By the way, in the above-mentioned apparatus, 8 pieces of the data blocks are placed between respective times when the 3 low order digits of the counted value (binary numeral) of the data block counter 9 become [000], but a case of placing 4 pieces is shown in FIG. 7 to simplify the description.

Figure 7:
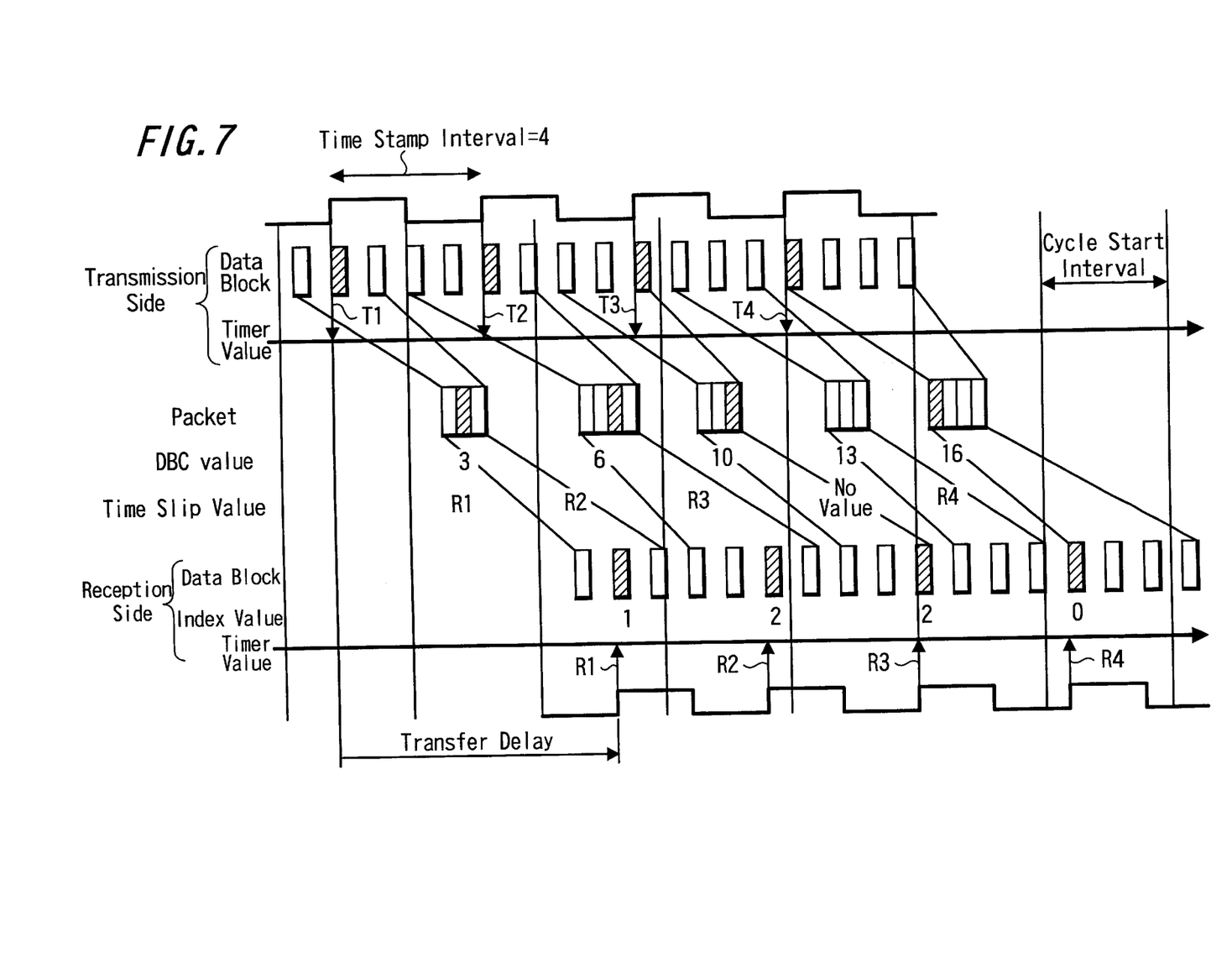
FIG. 7 is a diagram for describing use of the isochronous packet.

In the uppermost rank of this FIG. 7 is shown output of the data block counter and the output rises at every four pieces of generated data blocks shown in the next rank. Therefore, on the transmitting side, a diagonally shaded data block next to the rising edge of the output is a data block corresponding to the reference time (time stamp data). Also, timer values (T1, T2, . . . ) on this occasion become the reference time on the transmitting side.

On the other hand, date blocks generated at a previous cycle start interval are collected to form the isochronous packet at each cycle start interval shown wholly by vertical lines. The counted value (DBS) of data block counter 9 when the first data block is formed among them and the next counted value (DBC) of the data block counter 9 when the last data block is formed are transmitted on the CIP header.

On the receiving side, the counted value (DBC) transmitted on a previously received isochronous packet is the counted value of the data block counter 9 when the first data block of an isochronous packet currently received is formed, and a data block when the two lower order digits of the counted value become [00] after starting count from this counted value (DBC) becomes a diagonally shaded data block corresponding to the reference time (time stamp data) at intervals of four pieces of data blocks.

By taking out data blocks so that the diagonally shaded data blocks may coincide with timer values (R1, R2, . . . ) on the receiving side, data blocks in synchronism with the reference time can be taken out. In addition, by previously setting the transmitted timer value of the reference time (time stamp data) on the transmitting side at shifted values (R1, R2 . . . ) in consideration of a time necessary for the transmission processing, synchronization with the timer values on the receiving side can be facilitated.

Furthermore, by using the data block taken out in synchronism with the reference time, a clock signal at intervals (48 kHz) wherein the above-mentioned data block is formed and a 96 kHz clock signal which doubles this clock signal can be formed. Thus, in FIG. 3, by supplying a signal in synchroizm with data blocks derived from the CIP header analyzing circuit 23 of to a phase lock (PLL) frequency dividing circuit 24, the above-mentioned clock signals of 48 kHz and 96 kHz can be formed.

The data blocks derived from the CIP header analyzing circuit 23 are supplied to a memory 25 which is made a first-in first-out (FIFO) structure. Then the data blocks corresponding to, for example, the above-mentioned reference time (time stamp data) cen be taken out of the memory 25 at timing of the reference time by an interface (I/F) circuit 26 which is timing controlled by the above-mentioned clock signals of 48 kHz and 96 kHz. The subsequent data blocks thereto can be taken out sequentially in synchronism with the clock signals.

In other words, when the fourth bits in the fifth to eighth row is [1] in the above-mentioned isochronous packet, by making 24 bits sample data in the seventh and eight rows, digital acoustic signals are taken out every 96 kHz clock signal. Also, when the fourth bits in the ninth and tenth rows is [0], a digital acoustic signal is obtained by taking out 16 bits sample data in each of ranks at every 48 kHz clock signal.

In this manner, respective digital acoustic signals induding a left channel (24-bit, 96 kHz, Main, Lch) and a right channel (24-bit, 96 kHz, Main, Rch) of a main acoustic signal of, for example, a sampling frequency of 96 kHz, the quantized bit number of 24 bits, and a left channel (16-bit, 48 kHz, Rear, Lch) and a right channel (16-bit, 48 kHz, Rear, Rch) of a sub-acoustic signal of a sampling frequency of 48 kHz, the quantized bit number of 16 bits can be brought out.

Meanwhile, when an interval between the interface circuit 26 and subsequent circuits there are 2 pieces of serial interfaces of, for example, 96 kHz sample data of 2 channels and 48 kHz sample data of 2 channels, as shown on the receiving side in FIG. 5, four pieces of sample data of the left and right channels of the main acoustic signal are brought to a 96 kHz serial interface and two pieces of sample data of the left and right channels of a sub-acoustic signal are brought to a 48 kHz serial interface so that respective digital acoustic signals may be brought out.

These digital acoustic signals are further supplied to a D/A converting circuit 27 (FIG. 3), respectively. In this case, the sample data of a sampling frequency of 48 kHz can be put into analog data by a D/A converter of 96 kHz by using the same value twice at a time by, for example, holding a previous value. Also, the sample data of the quantized bit number of 16 bits can be put into analog data by a 24 bit D/A converter which makes its value high order. Then the above-mentioned D/A converting circuit 27 can now be implemented by using, for example, the 24 bit and 96 kHz D/A converter.

The acoustic signals D/A converted by the D/A converting circuit 27 are supplied to a speakers group 4 through an output amplifier 28. Consequently, digital acoustic signals derived from a recording medium (disc 1) of DVD audio or the like including: left and right channels of a main acoustic signal of, for example, a sampling frequency of 96 kHz and the quantized bit number of 24 bits; and of left and right channels of the sub-acoustic signal of sampling frequency of 48 kHz and the quantized bit number of 16 bits are transmitted through, for example, IEEE1394 serial bus 20 and emitted from the speakers group 24.

Therefore, according to the method and apparatus of the present invention, collecting together data-generated during the sampling periods of sample data at different sampling frequencies to form a data block and adding counter data of the counted value of the number of data samples generated during that period, signals of different sampling frequencies can be transmitted in one lot and these sample data can easily be reconstructed and restored.

As described above, there has been a fear that it is impossible to transmit collectively signals at different sampling frequencies on the conventional transmission format, and if such signals are to be transmitted, there incurs a deterioration in data transmitting efficiency as well as complexity of an apparatus. However, according to the present invention, these problems can easily be solved.

Furthermore, according to the above-mentioned method and apparatus, by making a higher sampling frequency twice or a multiple of a lower sampling frequency, the number of sample data included in 1 data block on the side of the higher sampling frequency can be made a multiple of the number of sample data by the lower frequency, thus making it possible to easily form the data block. However, the relation between these sampling frequencies can be determined optionally.

Moreover, in the above-mentioned method and apparatus, by adding time stamp data indicating a reference time at every prescribed number of data blocks for transmission, the receiving side can easily achieve synchronization of data blocks and easily generate a clock signal and the like for D/A conversion by using the data blocks.

Furthermore, by causing two or more pieces of the data blocks to which the time stamp data is added not to be included in a plurality thereof transmitted en bloc, the synchronization of data blocks by the time stamp data can be further facilitated. Additionally, by shifting the time stamp data beforehand in view of a time required for a transmission processing, the synchronization of data blocks by the time stamp data can be still more facilitated.

Furthermore, by taking out data blocks on and after a specified data block, based on the time stamp data and an internal clock, it becomes possible to smoothly take out the data blocks. Also, by forming clock signals of a first and second sample frequencies based on the time stamp data and the internal clock, formation of the clock signal can be done easily carried out.

It is noted that the present invention is not limited to the embodiments described above, and various kinds of modifications can be effected without departing from the spirit of the present invention.

Thereafter, according to the invention, by collecting together data generated during a sampling period of one of sample data by different sampling frequencies to form a data block and adding data of the number of the sample data generated during the period, transmission of sample data can be carried out so that signals of different sampling frequencies can be transmitted en bloc and these sample data can easily be reconstructed and restored.

While there has been a fear that it is impossible to transmit en bloc signals at different sampling frequencies on the conventional transmission format, and if such signals are to be transmitted, there occurs a deterioration in data transmitting efficiency as well as complexity of an apparatus, these problems can easily be solved according to the present invention.

Furthermore, according to the invention, by making a higher sampling frequency twice or a multiple of a lower sampling frequency, the number of sample data included in one data block on the side of the higher sampling frequency can be made a multiple of the number of sample data by of the lower sampling frequency, thus making it possible to easily form the data block.

Furthermore, according to the invention, by adding time stamp data indicating a reference time at every prescribed number of data blocks for transmission, the receiving side can easily achieve synchronization of data blocks and easily further out occurrence of a clock signal and the like for D/A conversion by using the data blocks.

In addition, according to the invention, by causing two or more pieces of the data blocks to which the time stamp data is added not to be included in a plurality thereof transmitted en bloc, the synchronization of data blocks by the time stamp data can be further facilitated.

Also, according to the invention, by providing time stamp data with a shifted value beforehand in of a time required for a transmission processing, the synchronization of the data blocks by the time stamp data can be still more facilitated.

Furthermore, according to the invention, by collecting together data generated during one of the sampling period of sample data different sampling frequencies to form a data block and adding data of the number of the sample data generated during the period, reception of sample data can be carried out so that signals of different sampling frequencies can be transmitted collectively and these sample data can easily be reconstructed and restored.

Furthermore, according to the invention, by making a higher sampling frequency two times or multiple of a lower sampling frequency, the number of data included in 1 data block on the side of the higher sampling frequency can be made a multiple of the number of sample data by the lower sampling frequency, thus making it possible to easily form the data block.

Furthermore, according to the invention, by adding time stamp data indicating a reference time at every prescribed number of data blocks for transmission, the receiving side can easily achieve synchronization of data blocks and further, easily generate of a clock signal and the like for D/A conversion by using the data blocks.

Moreover, according to the invention, by causing more than two or more pieces of the data blocks to which the time stamp data is added not to be included in a plurality thereof transmitted en bloc, the synchronization of data blocks by time stamp data can be further facilitated.

Further, according to the invention, by taking out data blocks on and after a specified data block, based on the time stamp data and an internal clock, it becomes possible to smoothly take out the data blocks.

Furthermore, according to the invention, by forming clock signals of a first and second sampling frequencies based on the time stamp data and the internal clock, formation of the clock signal can be done easily carried out.

In addition, according to the invention, by collecting together data generated during one of the sampling periods of sample data by different sampling frequencies to form a data block and adding data of on the number of the sample data generated during that period, transmission of sample data can be carried out so that signals of different sampling frequencies can be transmitted en bloc and these sample data can easily be reconstructed and restored.

Also, according to the invention, by making a higher sampling frequency twice or a multiple of a lower sampling frequency, the number of sample data included in one data block by the higher sampling frequency can be made a multiple of the number of sample data by the lower sampling frequency, thus making it possible to easily form the data block.

Further, according to the invention, by adding time stamp data indicating a reference time at every prescribed number of data blocks, the receiving side can easily achieve synchronization of data blocks and further easily generate of a clock signal and the like for D/A conversion by using the data blocks,.

Furthermore, according to the invention, by causing two or more pieces of the data blocks to which the time stamp data is added not included in a plurality thereof transmitted en bloc, the synchronization of data blocks by the time stamp data can be further facilitated.

In addition, according to the invention, by providing time stamp data with a value shifted beforehand in view of a time required for a transmission processing, the synchronization of the data blocks by the time stamp data can be facilitated.

Furthermore, according to the invention, by making a higher sampling frequency twice or multiple of a lower sampling frequency, the number of sample data included in one data block by the higher sampling frequency can be made a multiple of the number of sample data by the lower sampling frequency, thus making it possible to easily form the data block.

Furthermore, according to the invention, by adding time stamp data indicating a reference time at every prescribed number of data blocks for transmission, the receiving side can easily achieve synchronization of data blocks and further easily generate of a clock signal and the like for D/A conversion by using the data blocks.

Moreover, according to the invention, by causing two or more pieces of the data blocks to which the time stamp data is added not included in a plurality thereof transmitted en bloc, the synchronization of data blocks by the time stamp data can be further facilitated.

Further, according to the invention, by taking out data blocks after specified data blocks, based on the time stamp data and an internal clock, it becomes possible to smoothly take out the data blocks.

Furthermore, according to the invention, by forming clock signals of a first and second sampling frequencies based on the time stamp data and the internal clock, formation of the clock signal can be easily carried out.

In addition, according to the invention, by collecting together data generated during a sampling period of one of sample data at different sampling frequencies to form a data block and adding data of the number of the sample data generated during that period, it is possible to implement an apparatus for transmitting sample data so that signals of different sampling frequencies can be transmitted collectively and these sample data can easily be reconstructed and restored.

Also, according to the invention, by making a higher sampling frequency twice or a multiple of a lower sampling frequency, the number of sample data included in 1 data block on the side of the higher frequency can be made multiple-times the number of data on the side of the lower frequency, thereby making it possible to easily form a data block.

Furthermore, according to the invention, by adding time stamp data indicating a reference time at every prescribed number of data blocks, the receiving side can easily obtain synchronization of data blocks and by further using the data blocks, further easily generate of a clock signal and the like for D/A conversion.

Furthermore, according to the invention, by causing two or more pieces of the data blocks to which the time stamp data is added not to be included in the plurality thereof numbers transmitted en bloc, the synchronization of data blocks by time stamp data can be further facilitated.

In addition, according to the invention, by providing time stamp data with a value shifted beforehand in consideration of a time required for a transmitting process, synchronization of the data blocks by the time stamp data can be still more facilitated.

Moreover, according to the invention, by collecting together data on one hand generated during a sampling period of one of sample data by different sampling frequencies to form a data block and adding data of the number of the sample data generated during that period, it is possible to implement an apparatus for receiving sample data so that signals of different sampling frequencies can be transmitted en bloc and these sample data can easily be reconstructed and restored.

Also, according to the invention, by making a higher sampling frequency twice or multiple of a lower sampling frequency, the number of sample data included in one data block by the higher sampling frequency can be made a multiple of the number of sample data by the lower frequency, thus making it possible to easily form the data block.

Furthermore, according to the invention, by adding time stamp data indicating a reference time at every prescribed number of data blocks, the receiving side can easily achieve synchronization of data blocks and, easily generate of a clock signal and the like for D/A conversion by using the data blocks.

Furthermore, according to the invention, by causing two or more pieces of the data blocks to which the time stamp data is added not to be included in a plurality thereof numbers transmitted en bloc, the synchronization of data blocks by the time stamp data can be further facilitated.

Moreover, according to the invention, by taking out data blocks on and after a specified data block, based on the time stamp data and the internal clock, it becomes possible to smoothly take out the data blocks.

Furthermore, according to the invention, by forming clock signals of a first and second sampling frequencies based on the time stamp data and the internal clock, formation of the clock signal can be done easily.

In addition, according to the invention, by collecting together data generated during a sampling period sample data at different sampling frequencies to form of a data block and adding data of the number of the sample data generated during the period, it is possible to implement an apparatus for transmitting of sample data can be carried out so that signals at different sampling frequencies can be transmitted collectively and these sample data can easily be reconstructed and restored.

Also, according to the invention, by making a higher sampling frequency twice or multiple of a lower sampling frequency, the number of sample data included in one data block at the higher sampling frequency can be made a multiple of the number of sample data on the side of the lower sampling frequency, thus making it possible to easily form the data block.

Furthermore, according to the invention, by attaching time stamp data indicating displays a reference time at every prescribed number of data blocks, the receiving side can easily achieve synchronization of data blocks and further easily generate of a clock signal and the like for D/A conversion by using the data blocks.

Furthermore, according to the invention, by causing two or more of the data blocks to which the time stamp data is added not to be included in a plurality thereof transmitted en bloc, the synchronization of data blocks by the time stamp data can be further facilitated.

In addition, according to the invention, by providing time stamp data with a value shifted beforehand in consideration of a time required for a transmitting process, the synchronization of the data blocks by the time stamp data can be still more facilitated.

Also, according to the invention, by making a higher sampling frequency two times or multiple of a lower sampling frequency, the number of sample data included in one data at the higher sampling frequency can be made a multiple of the number of sample data at the lower sampling frequency, thus making it possible to easily form the data block.

Furthermore, according to the invention, by adding time stamp data indicating a reference time at every prescribed number of data blocks, the receiving side can easily achieve synchronization of data blocks and further easily generate of a clock signal and the like for D/A conversion by using the data blocks.

In addition, according to the invention, by causing two or more of the data blocks to which the time stamp data is added not to be included a plurality thereof numbers transmitted en bloc, synchronization of data blocks by the time stamp data can be further facilitated.

Further, according to the invention, by taking out data blocks on and after a specified data block, based on the time stamp data and an internal clock, it becomes possible to smoothly take out the data blocks.

Furthermore, according to the invention, by forming clock signals of a first and second sampling frequencies based on the time stamp data and the internal clock, formation of the clock signal can be done easily.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A sample data transmitting method for transmitting first data portions sampled at a first sampling frequency and second data portions sampled at a second sampling frequency, wherein said first sampling frequency is higher than said second sampling frequency by an integer multiplier of said second sampling frequency, the method comprising the steps of:

forming a plurality of data blocks of said first data portions sampled at said first sampling frequency and said second data portions sampled at said second sampling frequency, generating a first count value when a first data block of said plurality of data blocks is formed and a second count value when a last data block of said plurality of data blocks is formed, forming a transmission packet including said first and second count values as a header and said plurality of data blocks, and transmitting said transmission packet formed in said step of forming the transmission packet.

2. The sample data transmitting method according to claim 1, further comprising a step of adding time stamp data indicating a reference time to said header.

3. The sample data transmitting method according to claim 2, wherein in the step of adding, said time stamp data is provided with a value that is shifted taking into account a time necessary for transmitting said transmission packet.

4. A sample data receiving method for receiving a transmitted signal consisting of a plurality of transmission packets each formed of first data portions sampled at a first sampling frequency and second data portions sampled at a second sampling frequency, wherein the first sampling frequency is higher than said second sampling frequency by an integer multiplier of said second sampling frequency, wherein said first and second data portions generated during a sampling period of said second sampling frequency are collected together in predetermined cycles to form a plurality of data blocks in each transmission packet, and a first counted value is generated when a first data block of said plurality of data blocks is formed and a second count value is generated when a last data block of said plurality of data blocks is formed and are added as a header to each transmission packet with said plurality of data blocks for transmission, the method comprising the steps of:

forming a first clock signal of said second sampling frequency, forming a second clock signal of said first sampling frequency from said second clock signal, and reconstructing the plurality of data blocks formed of said first and second data portions in each transmission packet by discriminating data of the first counted value and the second counted value contained in the header of each transmission packet.

5. The sample data receiving method according to claim 4, wherein time stamp data indicating a reference time is contained in said header of each transmission packet, and further comprising the step of:

performing a signal reception processing based on said time stamp data.

6. The sample data receiving method according to claim 5, comprising a further step of forming clock signals of said first and second sampling frequencies based on said time stamp data and an internal clock signal.

7. A sample data transmission and reception method for transmitting a plurality of transmission packets each formed of first data portions sampled at first sampling frequency and second data portions sampled at a second sampling frequency, wherein said first sampling frequency is higher than said second sampling frequency by an integer multiplier of said second sampling frequency, wherein a transmitting side collects together in predetermined cycles said first and second data portions during a sampling period of said second sampling frequency to form a plurality of data blocks in each transmission packet, generates a first counted value when a first data block of said plurality of data blocks in a transmission packet is formed and generates a second counted value when a last data block of said plurality of data blocks in the transmission packet is formed, and adds the first and second count values as a header to the transmission packet including the plurality of data blocks; and a receiving side forms a second clock signal of said second sampling frequency, forms a first clock signal of said first sampling frequency by multiplying said second clock signal, and forms discriminating data of the first counted value and the second counted value contained in the header of each transmission packet to reconstruct said plurality of data blocks upon reception.

8. The sample data transmission and reception method according to claim 7, further comprising adding time stamp data indicating a reference time to the header of each transmission packet.

9. The sample data transmission and reception method according to claim 8, in which said time stamp data is provided with a value shifted by taking into account a time required for a transmission processing.

10. The sample data transmission and reception method as claimed in claim 7, comprising the further steps of:

receiving said data blocks to which time stamp data indicating a reference time is added at every prescribed number of data blocks; and performing a reception process based on said time stamp data.

11. The sample data transmission and reception method according to claim 10, comprising the further step of
taking out data blocks on and after a specified data block based on said time stamp data and an internal clock.

12. The sample data transmission and reception method according to claim 10, comprising the further step of
forming clock signals of said first and second sampling frequencies based on said time stamp data and an internal clock.

13. A sample data transmitting apparatus for transmitting a plurality of transmission packets formed of first data portions sampled at a first sampling frequency and second data portions sampled at a second sampling frequency, wherein the first sampling frequency is higher than said second sampling frequency by an integer multiplier of said second sampling frequency, comprising
means for collecting said first and second data portions to form a plurality of data blocks,
means for generating counter data corresponding to a first count value when a first data block of the plurality of data blocks in each transmission packet is formed and a second count value when a last data block of the plurality of data blocks of the transmission packet is formed,
means for forming transmission packets formed of a predetermined number of the data blocks of said first data portions and said second data portion, with said first and second count values as a header in each transmission packet, and
means for transmitting said transmission packets formed in said means for forming.

14. The sample data transmitting apparatus according to claim 13, further comprising
adding means for adding time stamp data indicating a reference time to the header of each transmission packet.

15. The sample data transmitting apparatus according to claim 14, further comprising
means for providing said time stamp data with a value shifted by taking into account a time required for a transmission processing.

16. A sample data receiving apparatus for receiving a transmitted signal consisting of
first data portions sampled at a first sampling frequency and second data portions sampled at a second sampling frequency, wherein the first sampling frequency is higher than said second sampling frequency by an integer multiplier of said second sampling frequency, and in which
said first and second data portions generated during a sampling period of said second sampling frequency are collected in predetermined cycles to form a plurality of data blocks in each transmission packet, and generating counter data corresponding to a first counted value when a first data block of said plurality of data blocks is formed and corresponding to a second counted value when a last data block of said plurality of data blocks is formed, wherein the first counted value and the second counted value are added as a header to the plurality of data blocks to form the transmission packet for transmission, the apparatus comprising:
means for forming a second clock signal of said second sampling frequency in response to a received signal;
means for forming a first clock signal of said first sampling frequency from said second clock signal, and
means for discriminating data of the first count value and the second count value contained in the header of each transmission packet to reconstruct a data row of said data block for reception.

17. The sample data receiving apparatus according to claim 16, further comprising:
means for receiving said transmission packet to which is added time stamp data indicating a reference time to the header; and
means for performing a signal reception processing based on said time stamp data.

18. The sample data receiving apparatus according to claim 17, further comprising
means for taking out data blocks based on said time stamp data and an internal clock.

19. The sample data receiving apparatus according to claim 18, further comprising
means for forming clock signals of said first and second sampling frequencies based on said time stamp data and the internal clock.

20. A sample data transmission and reception apparatus for transmitting a plurality of transmission packets formed of first data portions sampled at a first sampling frequency and second data portions sampled at a second sampling frequency, wherein the first sampling frequency is higher than said second sampling frequency by an integer multiplier of said second sampling frequency, the apparatus comprising;
means for transmitting a transmission packet including a plurality of data blocks formed by collecting first and second data portions generated during a sampling period of said second sampling frequency and including counter data corresponding to a first counted value when a first data block of the plurality of data blocks is formed and a second counted value when a last data block of the plurality of data blocks is formed, wherein the first and second counted values are added as a header to the plurality of data blocks in the transmission packet; and
means for receiving including means for forming a second clock signal of said second sampling frequency, forming the first clock signal of said first sampling frequency by multiplying said second clock signal, and for discriminating said said first counted value and said second counted value contained in the header of the transmission packet to reconstruct said data blocks in the transmission packet.

21. The sample data transmission and reception apparatus according to claim 20, further comprising
means for adding time stamp data indicating a reference time to the header of the transmission packet.

22. The sample data transmission and reception apparatus according to claim 21, further comprising
means for providing said time stamp data with a value shifted by taking into account a time required for a transmission processing.

23. The sample data transmission and reception apparatus according to claim 21, further comprising:
   means for receiving said transmission packets to which time stamp data indicating a reference time is added to the header; and
   means for performing a reception processing based on said time stamp data.

24. The sample data transmission and reception apparatus according to claim 23, further comprising
   means for taking out data blocks based on said time stamp data and an internal clock.

25. The sample data transmitting apparatus according to claim 24, further comprising
   means for forming clock signals of said first and second sampling frequencies based on said time stamp data and the internal clock.

* * * * *